(12) United States Patent
Smook (10) Patent No.: US 12,467,435 B2
(45) Date of Patent: Nov. 11, 2025

(54) SPRING-MOUNTED GEAR MECHANISM HOUSING

(71) Applicants: ZF FRIEDRICHSHAFEN AG, Friedrichshafen (DE); ZF WIND POWER ANTWERPEN N.V., Lommel (BE)

(72) Inventor: Warren Smook, Huldenberg (BE)

(73) Assignees: ZF FRIEDRICHSHAFEN AG, Friedrichshafen (DE); ZF WIND POWER ANTWERPEN N.V., Lommel (BE)

(*) Notice: Subject to any disclaimer, the term of this patent is extended or adjusted under 35 U.S.C. 154(b) by 0 days.

(21) Appl. No.: 18/549,933

(22) PCT Filed: Aug. 9, 2022

(86) PCT No.: PCT/EP2022/072310
§ 371 (c)(1),
(2) Date: Sep. 11, 2023

(87) PCT Pub. No.: WO2023/036536
PCT Pub. Date: Mar. 16, 2023

(65) Prior Publication Data
US 2024/0167459 A1    May 23, 2024

(30) Foreign Application Priority Data
Sep. 10, 2021    (DE) .................. 10 2021 210 007.4

(51) Int. Cl.
*F03D 80/70*    (2016.01)
*F03D 15/10*    (2016.01)
*F03D 80/80*    (2016.01)

(52) U.S. Cl.
CPC ......... *F03D 80/703* (2023.08); *F03D 15/101* (2023.08); *F03D 80/80* (2016.05);
(Continued)

(58) Field of Classification Search
CPC .......... F03D 80/70; F03D 80/80; F03D 80/88; F03D 80/881
See application file for complete search history.

(56) References Cited

U.S. PATENT DOCUMENTS 8,210,507 B2 * 7/2012 Mitsch ..................... F16F 1/40
267/141.1
8,434,996 B2 * 5/2013 Bagepalli ............ G01M 5/0016
416/61

(Continued)

FOREIGN PATENT DOCUMENTS

CN           202065132 U    12/2011
DE     102010009863 A1     9/2011
(Continued)

OTHER PUBLICATIONS

Machine translation of DE 102015211794 A1 (Dec. 29, 2016) (Year: 2016).*

*Primary Examiner* — Christopher R Legendre
(74) *Attorney, Agent, or Firm* — LEYDIG, VOIT & MAYER, LTD.

(57) ABSTRACT

A drive arrangement for a wind turbine includes a main shaft, a housing, and a nacelle-mounted support structure. The main shaft of the drive arrangement for the wind turbine is completely supported in the housing. The housing of the drive arrangement for the wind turbine is at least partially resiliently mounted in the support structure.

15 Claims, 9 Drawing Sheets

(52) U.S. Cl.
CPC ..... *F05B 2240/14* (2013.01); *F05B 2260/301* (2013.01); *F05B 2260/964* (2013.01)

(56) References Cited

U.S. PATENT DOCUMENTS

| | | | |
|---|---|---|---|
| 8,834,120 B2 * | 9/2014 | De Ugarte | F03D 80/70 |
| | | | 416/170 R |
| 9,523,356 B2 * | 12/2016 | Michalski | F01D 25/28 |
| 10,018,186 B2 * | 7/2018 | Bergua | F03D 1/00 |
| 2008/0308980 A1 | 12/2008 | Mitsch | |
| 2011/0095537 A1 * | 4/2011 | Numajiri | F03D 80/70 |
| | | | 290/55 |
| 2012/0056071 A1 | 3/2012 | Michalski | |
| 2012/0076652 A1 * | 3/2012 | Ventzke | F03D 15/00 |
| | | | 416/61 |
| 2013/0195653 A1 * | 8/2013 | Hayashi | F03D 7/0296 |
| | | | 416/1 |
| 2013/0195654 A1 | 8/2013 | Berger et al. | |
| 2019/0186467 A1 | 6/2019 | Eusterbarkey et al. | |
| 2020/0347829 A1 | 11/2020 | Vanhollebeke | |
| 2024/0167459 A1 * | 5/2024 | Smook | F03D 80/70 |
| 2025/0198389 A1 * | 6/2025 | Smook | F03D 80/703 |

FOREIGN PATENT DOCUMENTS

| | | |
|---|---|---|
| DE | 102010044297 A1 | 3/2012 |
| DE | 102015211794 A1 | 12/2016 |
| DE | 102018004763 A1 | 6/2019 |
| EP | 0525435 A1 | 2/1993 |
| EP | 1065374 A2 | 1/2001 |
| EP | 2003362 A2 | 12/2008 |
| EP | 2434154 A1 | 3/2012 |
| EP | 2732157 B1 | 3/2019 |
| KR | 20120131333 A * | 12/2012 |
| WO | WO 2019101516 A1 | 5/2019 |

* cited by examiner

Fig. 9 ial Application No.
PCT/EP2022/072310, filed on Aug. 9, 2022, and claims
benefit to German Patent Application No. DE 10 2021 210
007.4, filed on Sep. 10, 2021. The International Application
was published in German on Mar. 16, 2023 as WO 2023/
036536 A1 under PCT Article 21(2).

SPRING-MOUNTED GEAR MECHANISM HOUSING

CROSS REFERENCE TO RELATED APPLICATIONS

This application is a U.S. National Phase application under 35 U.S.C. § 371 of International Application No. PCT/EP2022/072310, filed on Aug. 9, 2022, and claims benefit to German Patent Application No. DE 10 2021 210 007.4, filed on Sep. 10, 2021. The International Application was published in German on Mar. 16, 2023 as WO 2023/036536 A1 under PCT Article 21(2).

FIELD

The invention relates to a drive arrangement.

BACKGROUND

Drive arrangements for wind turbines with resiliently mounted torque supports are known from the prior art. In a three-point bearing arrangement, a main shaft in a first bearing position is rigidly mounted in a nacelle of the wind turbine. In a second bearing position, the main shaft is mounted in a housing. The housing in turn has torque supports, which are connected to the nacelle via spring elements.

CN 202 065 132 U discloses a drivetrain for a wind turbine with a main shaft, which is fully supported in a housing. The housing forms a flange. The flange serves to fix the drivetrain in a corresponding flange of the nacelle. The flange of the housing and the flange of the nacelle are thereby rigidly screwed together.

SUMMARY

In an embodiment, the present disclosure provides a drive arrangement for a wind turbine comprises a main shaft, a housing, and a nacelle-mounted support structure. The main shaft is completely supported in the housing. The housing is at least partially resiliently mounted in the support structure.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention improves the bearing arrangement of a drivetrain for a wind turbine in a nacelle-mounted support structure.

The drive arrangement according to an embodiment of the invention includes a main shaft, a housing, and a nacelle-mounted support structure. A main shaft is an input shaft of a gearbox of the wind turbine. In an installed state, it is non-rotatably connected to a wind-driven rotor of the wind turbine.

The housing is preferably a gearbox housing, i.e. a housing of said gearbox, or a housing comprising at least the gearbox housing.

The nacelle-mounted support structure is a support structure that is rigidly mounted or configured to be rigidly mounted relative to a nacelle of the wind turbine, i.e. without the possibility of a relative movement. In particular, the nacelle itself can form the support structure.

The main shaft is fully supported in the housing. This means that the main shaft is supported with each of its bearings in the housing. The main shaft therefore has no bearing, with which it is not supported in the housing.

Each bearing of the main shaft has two bearing rings. A first of the two bearing rings is fixed to the main shaft or is an integral part of the main shaft. Accordingly, a second of the two bearing rings is fixed to the housing or is an integral part of the housing.

According to an embodiment of the invention, the housing is at least partially resiliently mounted in the support structure. This means that at least one bearing position, in which the housing is mounted in the support structure is configured to be resilient. A resiliently configured bearing position allows relative movements between the housing. The bearing position has one or more spring elements, the spring forces of which counteract these relative movements.

An embodiment of the invention makes it possible for not only the housing and part of the main shaft, but also the entire drivetrain of the wind turbine to be resiliently mounted. The drivetrain can be configured as a unit of components connected to each other non-resiliently. If there are no resilient movements between individual components of the drivetrain, the loads acting on the components are reduced and consequently so is the wear and tear.

In an embodiment, the housing is fully resiliently mounted in the support structure. This means that each bearing position of the housing is configured resiliently and has the one or more spring elements described above. No bearing position is of non-resilient configuration. A non-resilient bearing position has no spring element.

The fully resilient mounting of the housing allows for the drivetrain of the wind turbine and the support structure to be mechanically decoupled. The transmission of vibrations from the drivetrain into the support structure or in the opposite direction from the support structure into the drivetrain can be almost completely prevented.

In an embodiment, the housing is partially resiliently mounted and partially rigidly mounted in the support structure. This means that at least one bearing position is resilient and at least one bearing position is non-resilient. Preferably, exactly two bearing positions, such as the gearbox-side bearing position, are non-resilient and exactly two bearing positions, such as the generator-side bearing positions, are resilient.

Preferably, the drive arrangement is configured with at least two main bearings. A main bearing refers to a bearing of the main shaft. According to this embodiment, the main shaft is mounted in the housing by means of the at least two main bearings. The main bearings are axially spaced from one another, i.e. in the direction of an axis of rotation of the main shaft. There is thus an axial offset between the two bearings. A distance between the two bearings in the axial direction is greater than zero. Due to the axial offset, bending moments acting on the main shaft, i.e. torques acting in axial direction and/or orthogonally to the axis of rotation of the main shaft, can be absorbed.

In an embodiment, a planet carrier of the gearbox is at least partially supported by the main shaft. The planet carrier is therefore at least partially supported on the main shaft. This means that the main shaft at least partially absorbs a weight force of the planet carrier.

Preferably, the planet carrier is fully supported by the main shaft. In this case, the main shaft fully absorbs the weight of the planet carrier. This eliminates the need for a separate bearing arrangement for the planet carrier. The reduced number of bearing positions simplifies the configuration of the drivetrain.

Preferably, the drive arrangement is further configured with one or more elastomers. An elastomer is a spring element consisting of a viscoelastic polymer. By means of the one or more elastomers, the housing is resiliently mounted in the support structure. The housing thereby supports itself via the one or more elastomers in the support structure. The resilience of the elastomers allows for relative movements between the housing and the support structure. The use of elastomers in accordance with this further embodiment is advantageous because elastomers have a simple structure and are therefore inexpensive and fail-safe.

In an embodiment, elastomers of different stiffness are provided. According to this embodiment, a first elastomer and a second elastomer, as described above, serve to mount the housing in the support structure. The first elastomer and the second elastomer are characterized in that they have a different stiffness. The stiffness of the elastomers is influenced by their designed configuration and material hardness.

According to an embodiment, the first elastomer is arranged in a radial intermediate space between the housing and the support structure. The radial intermediate space extends in the radial direction, i.e. orthogonally to the axis of rotation of the main shaft. As a result, spring forces applied by the first elastomer counteract relative movements between the housing and the support structure in the radial direction.

The second elastomer is arranged in an axial intermediate space between the housing and the support structure. The axial intermediate space extends in the axial direction, i.e. parallel to the axis of rotation of the main shaft. Spring forces applied by the first elastomer correspondingly counteract relative movements between the housing and the support structure in the axial direction.

Due to the different hardnesses of the first elastomer and the second elastomer according to the embodiment, the drive arrangement can be adapted particularly well to vibration modes that differ in the axial and radial directions.

Preferably, the drive arrangement is configured with at least one bolt and at least two eyes that are aligned with each other. Eyes designate through-holes or blind holes that serve to receive a bolt. Presently, the housing and the support structure each have at least one of the eyes. The bolt engages in the eyes. Thus, a portion of the bolt is located in each of the at least two eyes. The eyes, together with a bolt engaging therein, form one of the bearing positions described above.

Preferred embodiments of the invention are shown in the figures. Matching reference numerals indicate thereby identical or functionally identical features.

Figure 1:
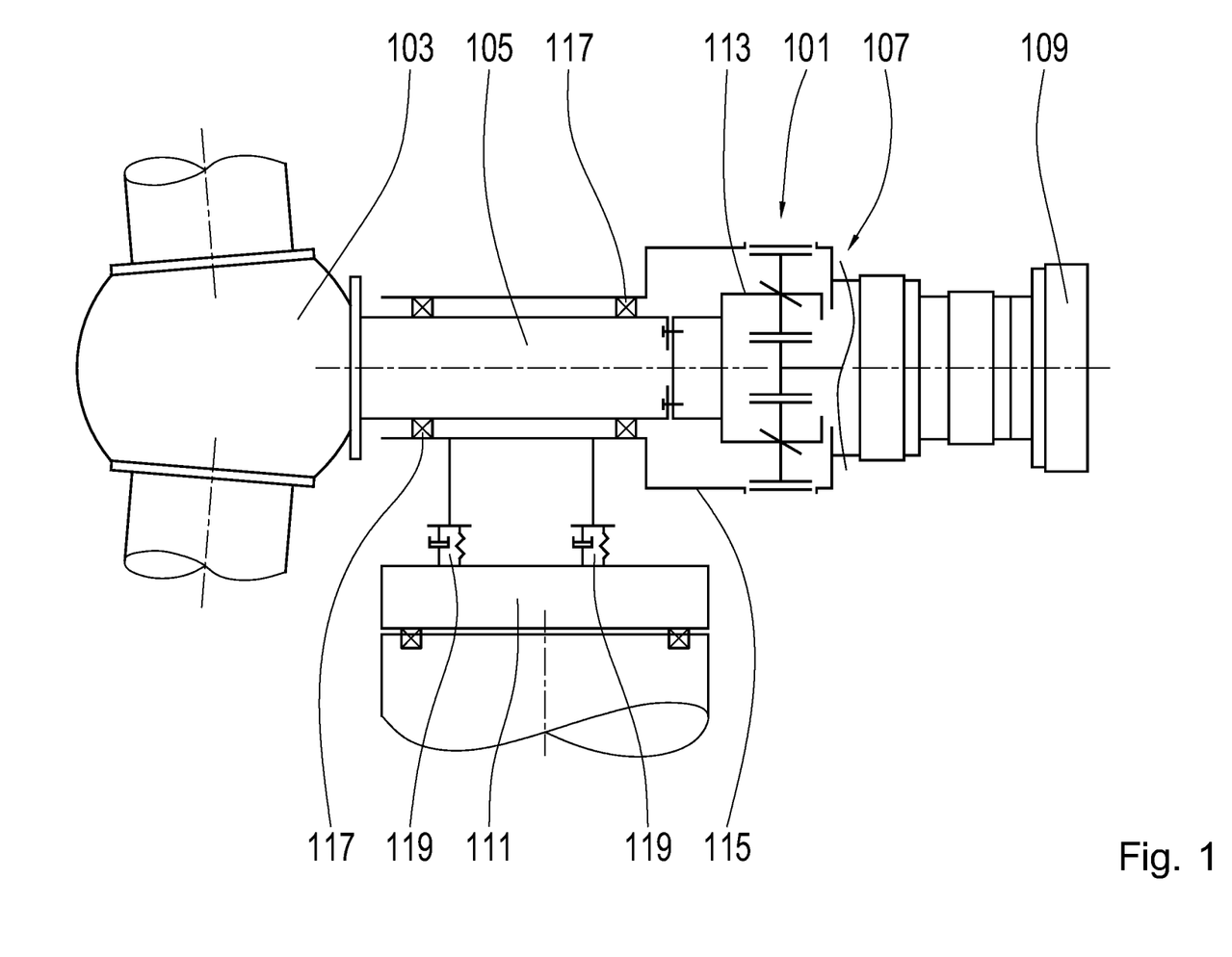
FIG. 1 illustrates a drive arrangement of a wind turbine.

The drive arrangement 101 shown in FIG. 1 comprises a wind-driven rotor 103, a main shaft 105, a gearbox 107, a generator 109 and a machine carrier 111. The main shaft 105 is configured as an input shaft of the gearbox 107. Via the main shaft 105, the rotor 103 is non-rotatably connected to a planet carrier 113 of a first planetary stage of the gearbox 107. The gearbox 107 converts a drive torque applied by the rotor 103 to the main shaft 105 and transmits it to the generator 109. The machine carrier 111 is part of a nacelle of the wind turbine.

The entire drivetrain shown, comprising the main shaft 105, the gearbox 107 and the generator 109, is housed in a single housing structure 115. Accordingly, the main shaft 105 is supported in the housing structure 115 by means of two main bearings 117. The two main bearings 117, each of which may be constructed from one or more bearing units, form the only bearing positions of the main shaft 105.

The planet carrier 113 does not have its own bearings. Instead, it is supported by the main shaft 105. For this purpose it is screwed to the main shaft 105.

The housing structure 115 consists of several parts that are rigidly screwed together. The housing structure 115 is resiliently mounted in the machine carrier 111 by means of elastomers 119.

Figure 2A:
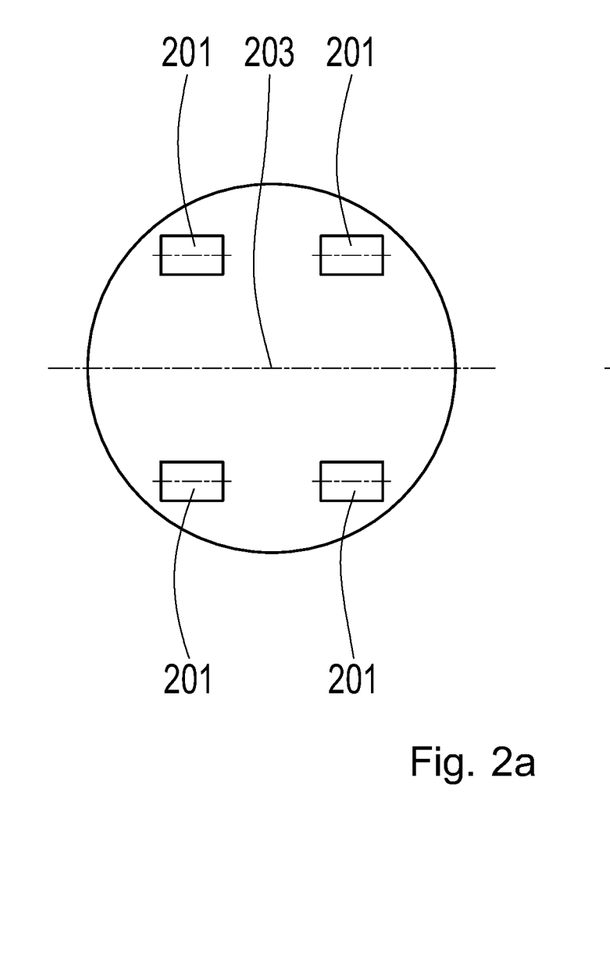
FIG. 2a illustrates an arrangement of bearing positions.
Figure 2B:
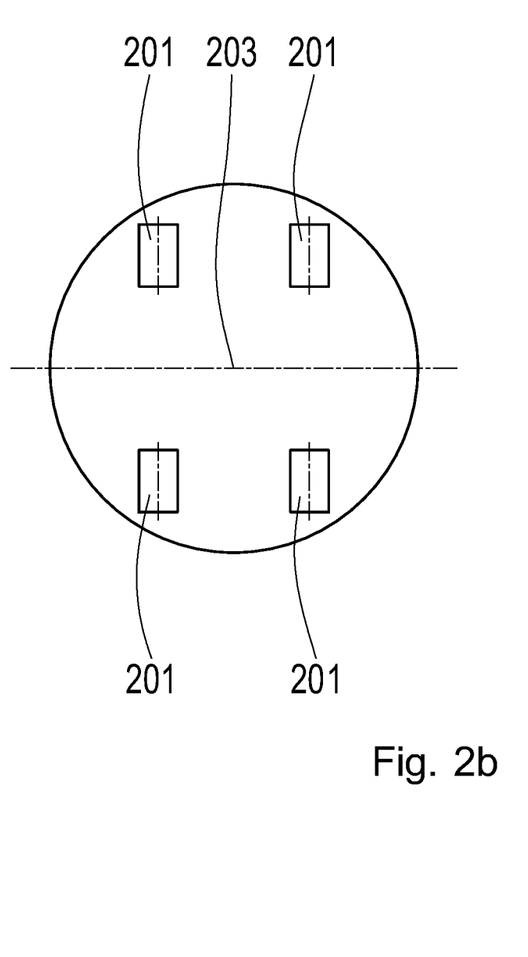
FIG. 2b illustrates an arrangement of bearing positions with alternative orientation.

Each elastomer 119 is part of a bearing position 201 shown in FIGS. 2A and 2B. As shown in FIG. 2A, the bearing positions 201 may be oriented such that their longitudinal axis is parallel to a rotational axis 203 of the main shaft 105. Alternatively, as shown in FIG. 2B, they may be oriented with their longitudinal axis orthogonally to the axis of rotation 203.

The drive arrangement 101 has exactly four bearing positions 201. Exemplary embodiments for the configuration of the bearing positions 201 are shown in FIGS. 3 to 10. The exemplary embodiments have in common that the machine carrier 111 forms two eyes 301 per bearing position 201. In each case, an eye 303 of the housing structure 115 is aligned with the two eyes 301. A bolt 305 is inserted into a pair of eyes 301 of the machine carrier 111 and a corresponding eye 303 of the housing structure 115. This bolt fixes the respective eye 303 of the housing structure 115 in the eyes 301 of the machine carrier 111.

Figure 3:
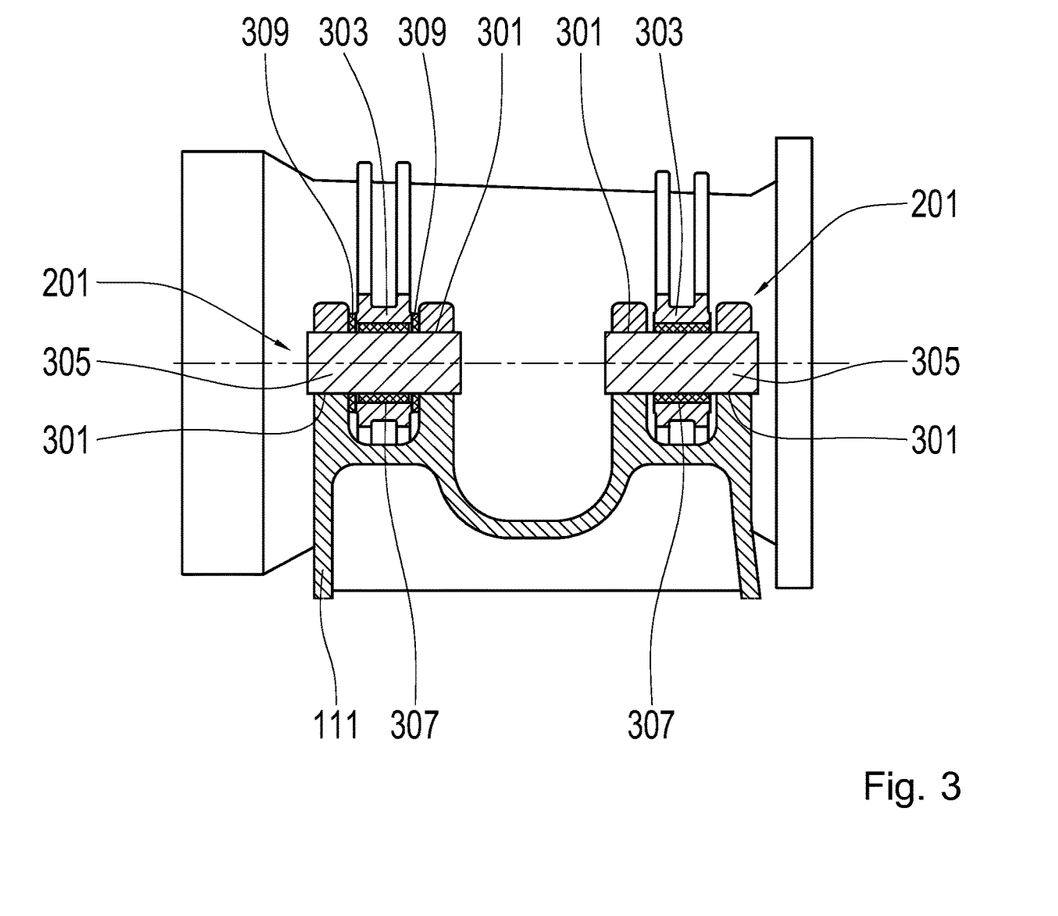
FIG. 3 illustrates a first embodiment of the bearing positions.

According to FIG. 3, the four bearing points 201 each have a hollow-cylindrical elastomer 307. This elastomer is located in the respective eye 303 of the housing structure 111. The hollow cylindrical elastomer 307 serves to transmit radial forces.

Two of the four bearing points 201 furthermore each have two disk-shaped elastomers 309. These are each located in an axial intermediate space between the eye 303 of the housing structure 111 and an eye 301 of the machine carrier 111. Accordingly, the elastomers 309 serve to absorb forces in the axial direction.

In the exemplary embodiments shown in FIGS. 4 to 10, in contrast to the exemplary embodiment shown in FIG. 3, the elastomers are not arranged in the eyes 303 of the housing structure 115, but in the eyes 301 of the machine carrier 111. Hollow-cylindrical elastomers 401 thereby serve to conduct forces in the radial direction.

Figure 4:
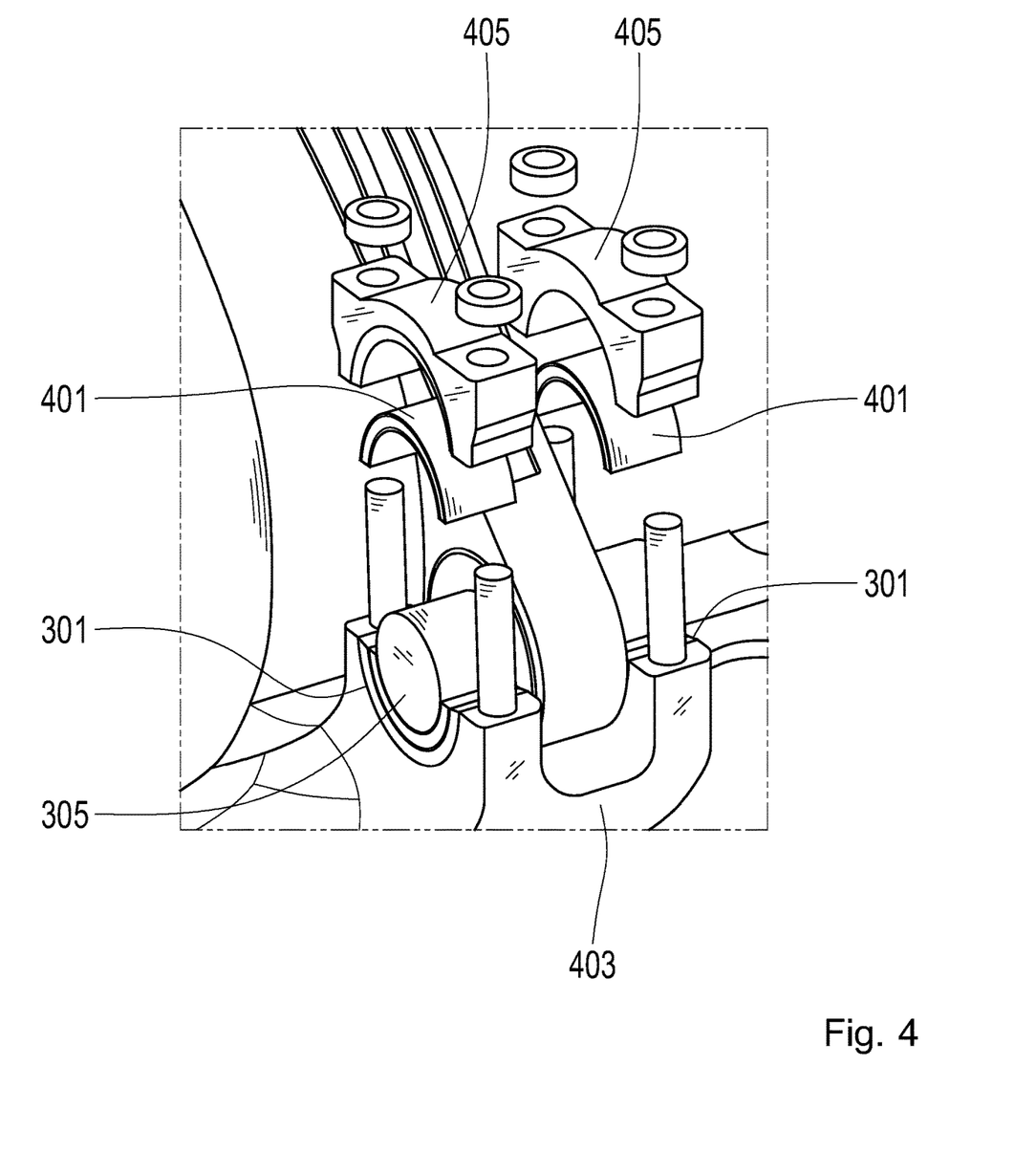
FIG. 4 illustrates an exploded view of the first embodiment.

A corresponding exploded view is shown in FIG. 4, where it can be seen that both the eyes 301 of the machine carrier 111 and the elastomers 401 have a two-piece configuration. Thus, the eyes 301 are each formed by a one-piece base body 403 and a bolted bridge 405 each. The elastomers 401 each consist of two half shells. The two-piece configuration of the eyes 301 and the elastomers 401 simplifies the assembly and the replacement of the elastomers 401.

Figure 5:
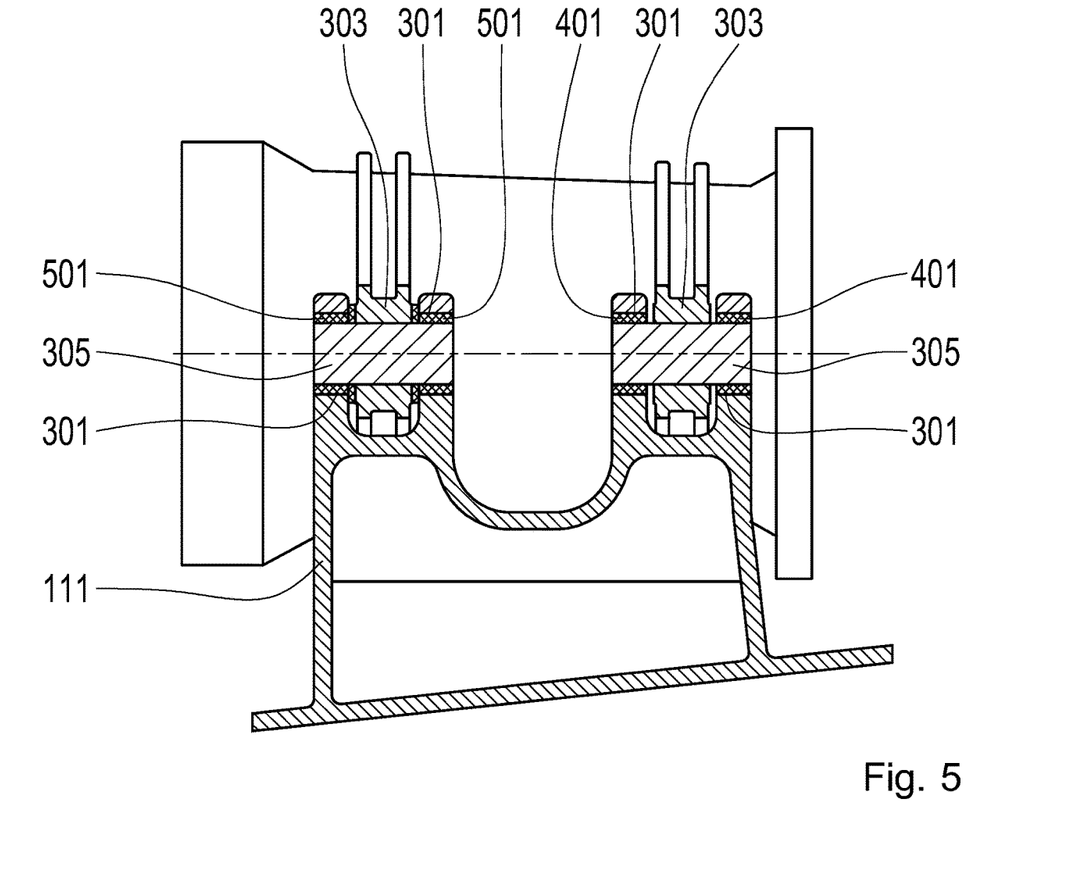
FIG. 5 illustrates a second embodiment of the bearing positions.

FIG. 5 further shows elastomers 501 with a hollow-cylindrical section and a disk-shaped section. The hollow-cylindrical section is located radially between the respective bolt 305 and an eye 301 of the machine carrier 111. This section serves to transmit forces in the radial direction. For transmitting forces in the axial direction, the disk-shaped section extends in an axial intermediate space between the respective eye 303 of the housing structure 115 and an eye 301 of the machine carrier 111.

Figure 6:
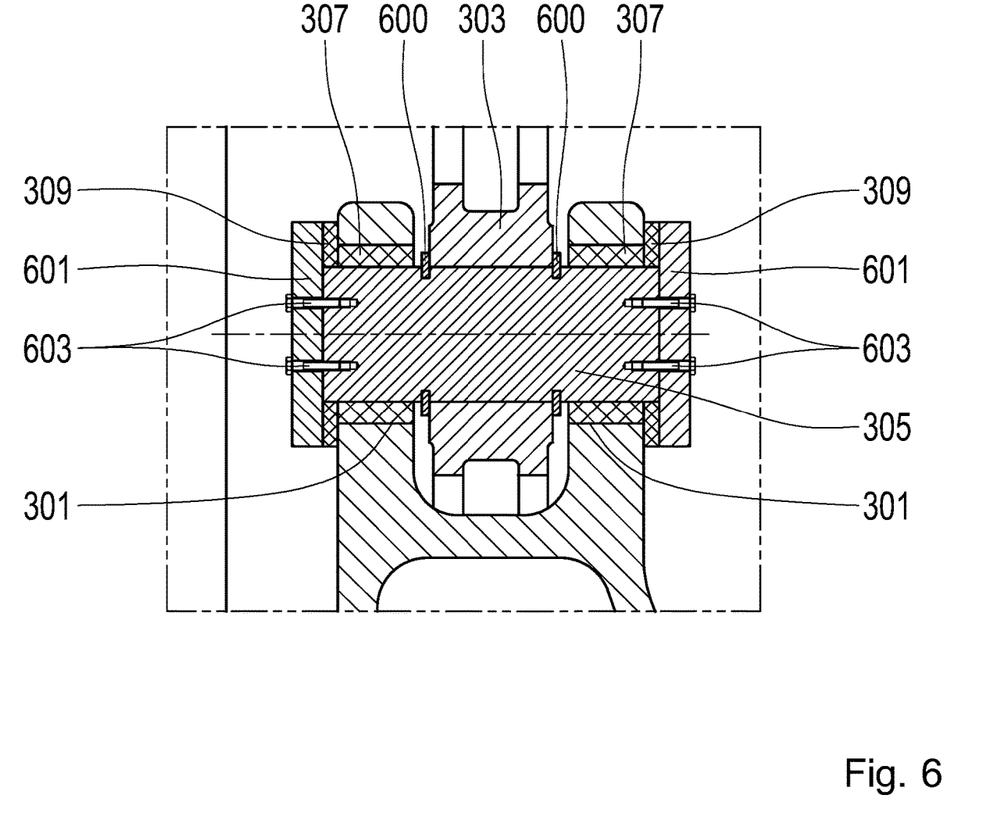
FIG. 6 illustrates a third embodiment of the bearing positions.
Figure 7:
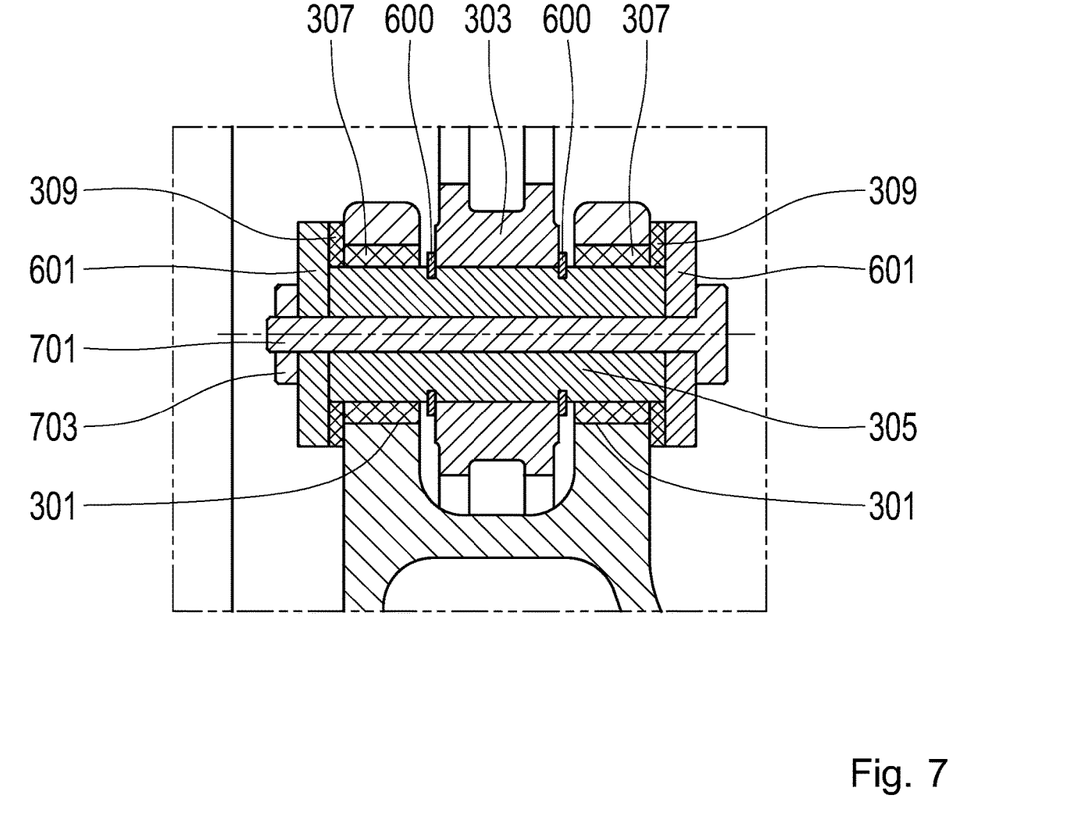
FIG. 7 illustrates a fourth embodiment of the bearing positions.
Figure 8:
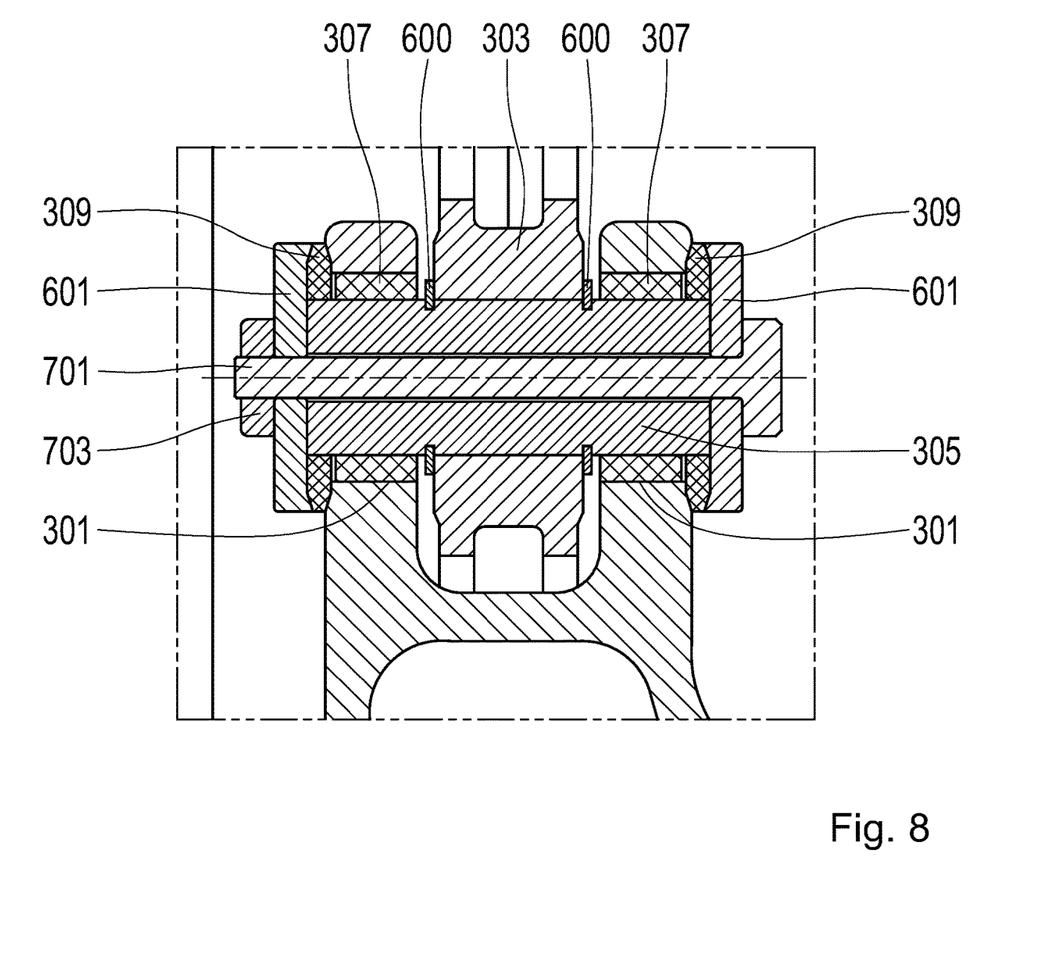
FIG. 8 illustrates a fifth embodiment of the bearing positions.

In accordance with FIGS. 6 to 8, an eye 303 of the housing structure 111 is fixed to a bolt 305 by means of retaining rings 600. Here, as well, the elastomers comprise a hollow-cylindrical section 307 and a disk-shaped section 309. However, the disk-shaped section 309 is located in an intermediate space between an eye 301 of the machine carrier 111 and an end plates 601, which is screwed to the bolt 305 by means of two screws 603 each.

FIG. 7 shows an alternative screw connection of the end plates 601. Here, a single screw 701 passes through the entire bolt 305 and the two end plates 601. The screw 701 is braced against the end plates 601 by means of a nut 703.

In accordance with FIG. 8, the disk-shaped sections 309 are conically shaped. The end plates 601 have a corresponding cup-shaped recess. This prevents the elastomers from deforming too much radially when subjected to an axial load.

Figure 9:
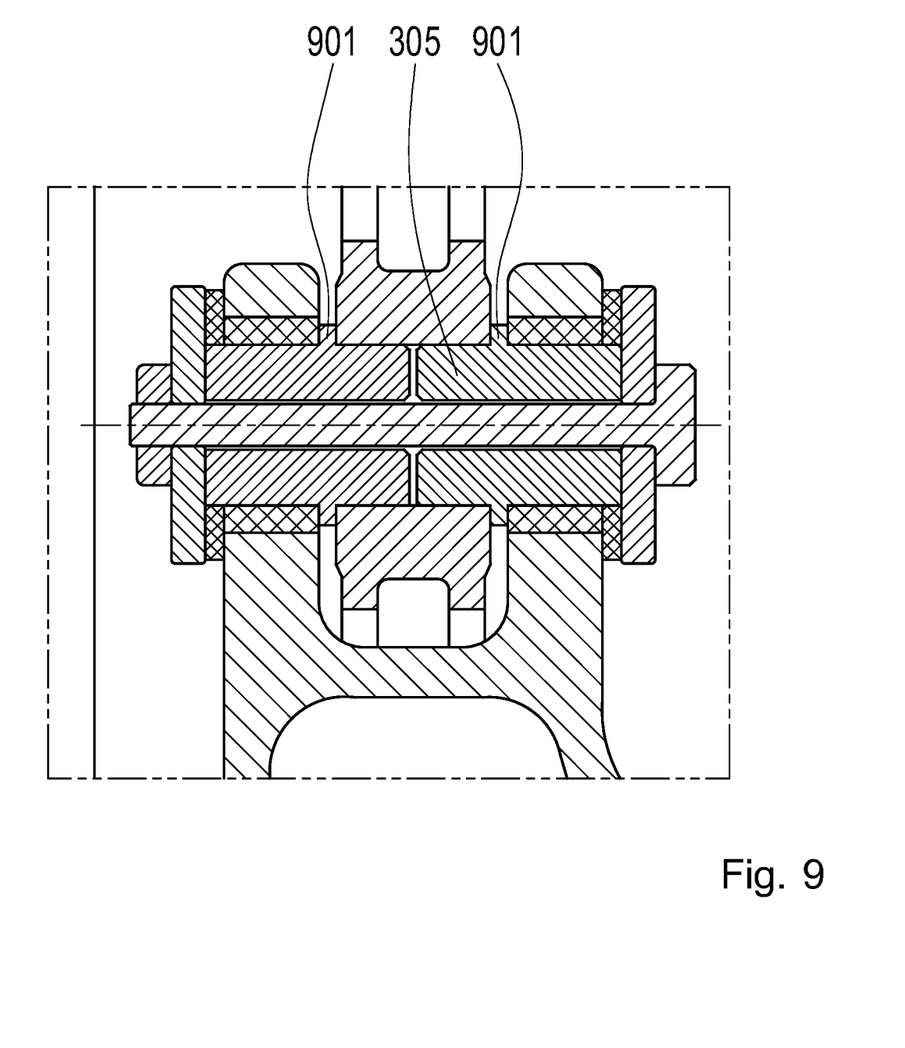
FIG. 9 illustrates a sixth embodiment of the bearing positions.

FIG. 9 shows a two-piece embodiment of a bolt 305. Here, the bolt 305 forms shoulders 901 that, instead of retaining rings, axially fix the bolt 305 in the eye 303.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 drive arrangement
103 rotor
105 main shaft
107 gearbox
109 generator
111 machine carrier
113 planet carrier
115 housing structure
117 main bearing
119 elastomer
201 bearing position
203 rotation axis
301 eye
303 eye
305 bolt
307 elastomer
309 elastomer
401 elastomer
403 basic body
405 bridge
501 elastomer
600 retaining ring
601 end plates
603 screw
701 screw
703 nut
901 shoulder

The invention claimed is:

1. A drive arrangement for a wind turbine, comprising:
a main shaft;
a housing;
a nacelle-mounted support structure; and
a first elastomer and a second elastomer of different hardness,
wherein the main shaft is fully supported in the housing,
wherein the housing is fully resiliently mounted in the support structure,
wherein the first elastomer is disposed in a radial intermediate space between the housing and the support structure, and
wherein the second elastomer is disposed in an axial intermediate space between the housing and the support structure.

2. The drive arrangement according to claim 1 comprising at least two main bearings,
wherein the main shaft is supported in the housing by the main bearings, and
wherein the main bearings are axially spaced from each other.

3. The drive arrangement according to claim 1 comprising a planet carrier supported by the main shaft.

4. The drive arrangement according to claim 1, wherein the housing is resiliently mounted in the support structure by the first elastomer and the second elastomer.

5. The drive arrangement according to claim 1 comprising at least one bolt and at least two aligned eyes,
wherein the housing and the support structure each have at least one of the eyes, and
wherein each bolt engages a pair of the at least two aligned eyes.

6. A drive arrangement, comprising:
a main shaft;
a housing structure with housing structure eye openings, wherein the housing structure surrounds the main shaft, and wherein the main shaft is supported in bearings arranged within the housing structure;

a nacelle-mounted support structure with support structure eye openings;

one or more bolts configured to extend through one or more of the housing structure eye openings, respectively, and one or more pairs of the support structure eye openings, respectively, such that the housing structure is mounted to the support structure via the one or more bolts; and at least two spring elements arranged such that:

the at least two spring elements are in at least two of the housing structure eye openings, respectively, such that each spring element is between a corresponding bolt of the one or more bolts and the housing structure, or the at least two spring elements are in at least two of the support structure eye openings, respectively, such that each spring element is between a corresponding bolt of the one or more bolts and the nacelle-mounted support structure, wherein the at least two spring elements have at least two different hardnesses.

7. The drive arrangement according to claim 6, wherein the nacelle-mounted support structure includes a one-piece base body and bridges configured to attach to the one-piece base body to form the support structure eye openings.

8. The drive arrangement according to claim 7, wherein at least two of the bridges of the nacelle-mounted support structure are arranged on opposing lateral ends of at least one housing structure eye opening, respectively, of the housing structure eye openings.

9. The drive arrangement according to claim 8, wherein each spring element is in a corresponding one of the support structure eye openings and arranged between the corresponding bolt of the one or more bolts and one of the bridges.

10. The drive arrangement according to claim 9, wherein a spring element of the at least two spring elements is arranged on opposing longitudinal sides of a respective one of the housing structure eye openings.

11. The drive arrangement according to claim 6, wherein the housing structure includes at least four of the housing structure eye openings and the nacelle-mounted support structure includes at least four of the support structure eye openings.

12. The drive arrangement according to claim 11, wherein a spring element of the at least two spring elements is arranged around each of the one or more bolts.

13. The drive arrangement according to claim 12, wherein a spring element of the at least two spring elements is arranged in each housing structure eye opening.

14. The drive arrangement according to claim 12, wherein the at least two spring elements are arranged in the support structure eye openings, respectively, and each spring element is a half-shell configuration.

15. The drive arrangement according to claim 6, wherein the main shaft includes a central axis, wherein at least one of the housing structure eye openings and at least one of the support structure eye openings have a first shared axis parallel to the central axis; and wherein at least one of the housing structure eye openings and at least one of the support structure eye openings have a second shared axis parallel to the central axis.

\* \* \* \* \*